United States Patent [19]

Valle-Riestra

[11] 4,048,007
[45] Sept. 13, 1977

[54] METHOD OF REMOVING SOLVENT RESIDUES FROM AQUEOUS PAPER PULPS

[75] Inventor: J. Frank Valle-Riestra, Walnut Creek, Calif.

[73] Assignee: The Dow Chemical Company, Midland, Mich.

[21] Appl. No.: 703,983

[22] Filed: July 9, 1976

Related U.S. Application Data

[63] Continuation-in-part of Ser. No. 577,263, May 14, 1975, abandoned.

[51] Int. Cl.$^2$ .............................................. D21C 9/00
[52] U.S. Cl. .......................................... 162/57; 162/5; 162/63; 162/65; 55/51; 55/53
[58] Field of Search ................... 162/5, 65, 63, 57; 55/53, 51

[56] References Cited

U.S. PATENT DOCUMENTS

| 3,595,741 | 7/1971 | Goss | 162/5 |
| 3,754,417 | 8/1973 | Jamieson | 162/65 |
| 3,910,813 | 10/1975 | Westcott et al. | 162/5 |

FOREIGN PATENT DOCUMENTS

| 1,201,367 | 8/1970 | United Kingdom | 162/65 |

OTHER PUBLICATIONS

McNamee, J. P., "Effects of Chemicals and Solvents on Roll Coverings of Various Types", Paperi Puu. 55, No. 10, pp. 781-784 (Oct. 1973), [ABIPC vol. 44, No. 10, 10635].

Primary Examiner—S. Leon Bashore
Assistant Examiner—William F. Smith
Attorney, Agent, or Firm—Robert R. Stringham

[57] ABSTRACT

It has been found that solvent residues can be removed from aqueous paper pulps by stripping with economic volumes of gases. This can be done in conventional contacting equipment without reducing pulp consistencies below the levels typical of commercial paper-making operations. The solvents stripped out are recoverable and do not constitute a source of pollution.

10 Claims, No Drawings

METHOD OF REMOVING SOLVENT RESIDUES FROM AQUEOUS PAPER PULPS

CROSS-REFERENCE TO RELATED APPLICATIONS

This Application is a continuation-in-part of application Ser. No. 577,263, filed May 14, 1975, now abandoned.

BACKGROUND OF THE INVENTION

In reclaiming paper wastes, it is known art to employ various solvents for such purposes as ink removal, resins dispersion and removal of wax coatings. In some reclaiming operations, solvent residues are retained upon pulping of wastes which have been solvent treated. In other operations, the wastes are first pulped and the pulp is solvent treated. The bulk of the solvent is readily separated as a distinct phase but a small amount of it remains as a dissolved and/or dispersed residue in the treated pulp. Conventionally, these residues have been removed by methods such as distillation or by stripping with superheated steam, at a stage prior to dewatering of the pulp.

In the course of developing an improved method of employing solvents in waste paper reclamation, removal of solvent residues from dewatered pulps in conventional steam dryers employing rubber covered rolls was contemplated. The solvent residues constituted such a small proportion (about 170 ppm) of the dewatered pulps that no substantial solvent swelling (and softening) of the rubber was anticipated. However, laboratory tests showed that the roll covers would be damaged to an intolerable extent if the solvent contents of the pulps were not reduced prior to drying. That is, the useful life of the roll covers would be reduced so much that the resulting technical and/or economic disadvantages would outweigh whatever advantages might be realized from the reclamation operation contributing the solvent residue to the pulp.

Gas stripping is a well-known method of removing volatiles from water and aqueous solutions but no suggestion of using this technique with slurries was found in the literature. Paper pulps, i.e., dispersions of cellulosic fibers, constitute a rather unique type of slurry, in that strong secondary bonding forces come into play when the concentration of fibers in a given volume of pulp exceeds that corresponding to a consistency of about 0.4 weight percent solids. At higher consistencies, the tendency towards inhomogeneity, i.e., clumping and settling, increases notably and can be overcome only by agitation intense enough to provide high shear rates. (It is known that pulp homogeneity can be maintained at consistencies as high as about 3 percent by devices such as "hydropulpers," but only at the expense of very considerable power inputs.) Thus, it could be expected that adequate dispersion of a gas in a commercial paper pulp might not be achievable without uneconomic power expenditures.

Attempts by the present applicant to establish intimate contact between air streams and intensely stirred pulps having consistencies in excess of about 1.5 percent were futile. Dispersion of air in the pulps could not be achieved and cavitation and channeling resulted.

There is also the consideration that even in pulps having consistencies as low as about 0.40–0.50%, a substantial degree of interaction between cellulosic fibers is still apparent. In fact, paper forming on a Fourdrinier screen requires a consistency (0.4–0.5%) such that this interaction will result in uniform matting as drainage proceeds (but without the occurrence of clumping prior to deposition on the screen). Thus, even at a pulp consistency of 0.4%, the existence of a uniform network of fibers within which relative motion between fibers is hampered by fiber-fiber and fiber-water attractive forces, is indicated. For this reason, it was considered possible that solvent droplets would be effectively "trapped" between closely spaced or touching portions of fibers. Additionally, interference with propagation in the liquid phase of the turbulent eddies believed essential to efficient mass transfer by diffusion could be anticipated. Therefore, even though relatively good dispersion of the stripping gas in the pulp were achieved, further reduction of solvent contents below already low (residual) levels still might require the use of excessively large volumes of stripping gas.

Preliminary dilution below the 0.4% level is of course contraindicated in view of the cost of reconcentration (after stripping).

OBJECTS OF THE INVENTION

An object of the present invention is to provide a non-polluting method of reducing the contents of solvents in aqueous pulps, of the consistencies employed for paper forming on Fourdrinier screens, which does not require distillation or steam stripping and can be carried out as a continuous operation in conventional gas/liquid contacting equipment.

A more particular object is to provide a method for reducing the solvent contents in such pulps below the level at which any substantial damage to rubber coated dryer rolls results, without employing impractically large volumes of gas.

A further object is to provide for the removal of solvent residues from paper pulps of commercial consistencies, simply by gas stripping and without further dilution.

Yet another object is to facilitate the use of solvents in waste-paper reclaiming operations by providing a simple and economic method of removing solvent residues from solvent-treated pulps.

Still other objects of the present invention will be apparent to those knowledgeable in the arts of paper making and reclamation.

SUMMARY OF THE INVENTION

It has now been discovered that gas stripping is a practical method for removing residual contents of volatile solvents from aqueous, cellulosic fiber pulps containing from about 0.4 to about 1.5 weight percent of fibers. Several times more stripping gas is required than in the absence of fibers but unconventional gas/liquid contacting equipment is not required and an uneconomic operation does not result.

More specifically, the present invention is the method of removing residual amounts of volatile solvents from aqueous pulps of cellulosic fibers by gas stripping, wherein said pulp contains from about 0.4 to about 1.5 weight percent of said fibers and is intimately contacted, under such conditions of agitation that its consistency remains essentially uniform throughout, with $n$ volumes of said gas, thereby removing at least a fraction of said solvent from said pulp, the ratio of $n$ to the volume of said gas required to remove the same fraction of solvent in the same manner, from the same volume of water containing the same initial amount of said solvent, being within the range of from about 1.5/1 to about 6/1.

By the term "residual amount of solvent," in the foregoing definition, is meant an amount equal to or less than that which will remain dissolved and/or dispersed in the pulp when a condition of equilibrium has been established between the pulp and a separate liquid body of the solvent in contact therewith. Any amount of solvent in excess of the residual amount can of course be removed simply by effecting a phase separation.

By the term "essentially uniform" is meant that the consistency of any volume element of the pulp is within the range of from about 90 to about 110 percent of the consistency of any other volume element of the pulp.

Of particular value is the embodiment of the preceding invention in which:

1. the nature and initial amount of said solvent in the pulp is such that if the pulp is dewatered and then steam dried on rubber covered rolls, the rubber will be damaged to an intolerable extent, and
2. stripping is continued until the content of said solvent in the pulp has been reduced to a level such that said rubber will not be damaged to an intolerable extent.

Preferably, the solvent carried off in the stripping gas is recovered.

Air is preferred as the stripping gas to be employed.

DETAILED DESCRIPTION OF THE INVENTION

The process of the present invention may be practiced with any aqueous pulp of cellulosic fibers contaminated with a volatile solvent and wherein the content of the fibers does not exceed about 1.5 weight percent. Theoretically, there is no lower limit on the content of fibers in the pulp. However, pulps containing less than about 0.4 to about 0.5 weight percent of fibers will usually require reconcentration in order to be suitable for paper making. Advantageously, the fibers content will be within the range of from about 0.5 to about 1.0 weight percent, preferably about 0.5 to about 0.75 weight percent.

By "volatile solvent" is meant one having a sufficient vapor pressure to permit reduction of the content of the solvent in the pulp by intimate contacting of the pulp and an economic amount of a stripping gas.

The applicability of the process is not limited to pulps consisting solely of water and cellulosic fibers. Any other materials, such as, for example, additives commonly used in papermaking, which do not interfere to an intolerable extent with the stripping action, may be present. Of course, if the stripped pulp is to be dewatered and then steam dried on rubber rolls, any such materials will necessarily be limited to those which do not damage the rolls (or other equipment used) to an intolerable extent.

Removal of solvent residues from aqueous pulps of cellulosic fibers derived from cellulosic materials other than paper is also within the ambit of the present invention.

Any otherwise suitable gas which will entrain the solvent to be removed (as liquid droplets or as separate molecules) may be employed as the stripping gas. Exemplary gases are carbon dioxide, methane, low boiling fluorocarbons, nitrogen and air. Ordinarily, water soluble gases such as $CO_2$ (which also affects pH and divalent cation solubilities) and flammable gases such as methane will not be employed, however. Fluorocarbons will have to be recovered, for both environmental and economic reasons. Nitrogen is much more expensive than air. Thus, air is highly preferred as the stripping gas.

When a pulp contaminated with a readily flammable solvent, such as, for example, benzene, is to be stripped with air, all due precautions to avoid formation of explosive mixtures obviously should be taken. Similarly, due regard must be had for the toxicities and/or moisture-induced corrosivities of some solvents with which a pulp may be contaminated.

The amount of undissolved solvent initially present in a pulp may be large enough that a substantial proportion of it can be coalesced (as by settling) into a separable liquid phase. When this is the case, a phase separation will ordinarily be carried out prior to the gas stripping operation, for obvious reasons of process efficiency, economy, etc. The feasibility of such a phase separation (without excessive settling of the cellulosic fibers) can easily be determined by laboratory tests. The aqueous phase, after carrying out a phase separation, may be regarded as "saturated," with regard to both dissolved solvent and mechanically held solvent droplets. Such a pulp will contain the maximum amount of solvent which will be present in the ordinary practice of the present invention. It has been found that complete removal of entrained solvent droplets from paper pulps of commercial consistencies by various phase separation techniques is quite difficult and residual solvent levels accordingly may be as high as about 3 to 5 wt. %, even with solvents, such as perchloroethylene, having quite low solubilities in water.

Theoretically, there is no lower limit on solvent content in a pulp for amenability to the practice of the instant process. As a practical matter, however, a lower limit will ordinarily be imposed by the requirement for increasingly large volumes of stripping gases to accomplish removal of a given amount of solvent as the activity (equal to or less than the concentration) of the solvent is reduced. Thus, it will generally not be economically feasible to treat (or to continue treating) pulps containing very small amounts of solvents (less than a few parts per million, for example).

Temperature is not a critical variable in the practice of the present invention. However, inherent lower and upper limits obviously are imposed by the freezing and boiling points of the aqueous portion of the pulp. In general, ambient or somewhat higher temperatures will be most convenient and economical. The vapor pressure of the solvent dispersed in the pulp will be higher at more elevated temperatures and smaller gas volumes will be required for removal of a given weight of solvent. The vapor pressure of the water present will also increase, but the correspondingly higher water content of the off gases will generally not pose any substantial handling problem.

Atmospheric or somewhat reduced pressures will generally be suitable, atmospheric pressure being distinctly preferred.

The contacting equipment employed may be any otherwise suitable equipment capable of effecting intimate contact between the pulp and the stripping gas without causing or favoring non-homogeneous dispersion of the fibers in the pulp, i.e., high enough localized consistencies to result in clumping or deposition of fibers.

A corresponding diversity of contacting methods may be employed. Thus, the pulp may be sprayed (through suitably designed nozzles) into a moving body of the stripping gas or the gas may be sparged (or inducted by a Venturi) into a body of the pulp. The stripping gas and pulp may be passed in counter current flow through a stripping column, such as, for example, a vertical succession of perforated trays having overflow wiers. Such turbulence as may be helpful to maximize the gas/liquid interfacial area is desirable but only under such flow conditions otherwise and within flow paths of such shape that no substantial inhomogeneity of the pulp results.

The volumes of stripping gas required per unit volume of pulp will depend on the temperature/vapor pressure relationship for the solvent(s) present, the temperature, the amounts of solvent dispersed and dissolved in the pulp and the degree of removal desired.

Suitable rates of flow of stripping gas through the pulp will be dictated by considerations such as the design of the contacting means (stripper) employed, post-contact phase disengagement, phase contact efficiency versus superficial velocity, etc., familiar to chemical engineers.

The optimum ratio and rate for any given gas and pulp are readily determined by means of well known laboratory contacting procedures and analytical methods.

The number of contact stages and stage efficiencies are also matters of stripper design familiar to chemical engineers. However, account must be taken of the fact that the presence of the fibers in the pump results in stripping efficiencies which range from about 1/1.5 down to about 1/6 of those attainable in the absence of fibers.

The depressing effect of increasing fiber content on stripping efficiency becomes quite significant as the fiber level rises to about 0.4 wt. percent and increases dramatically at the level (about 1.5%) where the tendency to fiber clumping and pulp inhomogeneity becomes pronounced. The latter effect is particularly important when attempting to reduce an already low content of dissolved solvent in the pulp, in which case the stripping efficiency is inherently low, even in the absence of fibers.

The following examples are meant to be illustrative only and the invention is not to be construed as limited thereto.

EXAMPLES

EXAMPLE 1

A glass perforated tray column was constructed to study the behavior of aqueous pulps of various consistencies flowing downward against an upward stream of stripping air. The column was 3 in. i.d. and contained two glass trays, 6 in. apart. each perforated with six 3/16 in. holes on 1-in. squares. Sealed downcomers were used for the aqueous pulp, with 1-in. overflow weirs. Air feed was maintained at a rate of 3 cubic feet per minute (superficial velocity of 1 ft/sec.); the aqueous pulp feed rate was varied between ⅛ and ½ gallons per minute.

Between consistencies (i.e., wt. % fibers) of 0 and 0.75%, smooth throughput of both phases was observed. No fiber accumulation occurred in dead spaces, and the aqueous suspensions behaved, for all practical purposes, as a homogeneous liquid. In particular, good circulation patterns were observed in the liquid pool on the trays.

At 1% consistency, fiber settling below the overflow weir and in the downcomer seal was first observed. With increasing pulp consistency, downcomer plugging was experienced. At 3% consistency (usual consistency in hydropulping equipment), liquid circulation on the trays was no longer observed; the air channeled up through the pulp and projected "blobs" of fibers into the vapor space above the tray.

The above example illustrates that in order to utilize perforated tray equipment, the pulp should be diluted to 1% consistency or less. At the low consistencies, the individual fibers remain separated in the aqueous suspension and will not settle out in mildly agitated pools. At higher consistencies, the fibers are attracted to each other to form slumps and mats which settle out more readily; moreover, they interfere more effectively with circulation patterns and eddies so that fiber agglomeration is accelerated.

In the following example, the effect of consistency upon stripping efficiency is illustrated.

EXAMPLE 2

In a single tray apparatus similar to that in Example 1, air at 20° C. was passed at a rate of 2 cubic feet per minute through 200 ml. batches of various consistency aqueous Kraft pulps containing initially 1% by volume (2.0 ml, or 3.5 g) of dispersed perchloroethylene, $C_2Cl_4$, which is very sparingly soluble in water (150 ppm). After 3 minutes, the residual weight of $C_2Cl_4$ found was:

| Consistency, % | Residual $C_2Cl_4$, g. | % Removed |
| --- | --- | --- |
| 0 | 0.10 | 97 |
| 0.5 | 0.92 | 74 |
| 3.0 | 1.80 | 48 |

The 3% consistency pulp could not be successfully handled in the equipment. The air formed open channels through the mud-like pulp and a substantial proportion of the pulp remained plastered on the vessel walls.

The above example illustrates that increasing consistency reduces the stripping efficiency, another reason why consistencies below 0.75% are preferred. The efficiency reduction is not though to be due to adsorption of solvent on fibers; cellulose fibers are strongly lyophobic, and microphotographs show that solvent droplets do not wet the fibers. The reduction is thought to be due to interference with turbulent mass transfer of solvent molecules through the aqueous phase by the long fibers. This is illustrated by stripping 0.5 wt. % suspensions of powdered $CaCO_3$ (rather than fibers) containing 1% by volume of perchloroethylene.

| Material | Residual $C_2Cl_4$, g. (After 3 min.) | % Removed |
| --- | --- | --- |
| Fibers | 0.92 | 74 |
| $CaCO_3$ | 0.25 | 93 |

The $CaCO_3$, even though offering a much larger surface area for adsorption, interferes less with turbulent mixing patterns because of the particle shape, and stripping is more effective.

In the following example, efficient evaporation of dispersed $C_2Cl_4$ droplets is effected in equipment which promotes mass transfer by creating a large contact area (spray column).

EXAMPLE 3

0.5% Consistency Kraft pulp containing 1% by volume dispersed perchloroethylene was sprayed at a rate of approximately 1 gallon per minute into a 55-gallon steel drum through a TEFLON® spiral spray nozzle. At this low a consistency a fine spray was obtained, and the construction of the spiral nozzle avoided plugging with fibers.

Air was introduced into the bottom of the drum at a rate of 20 cubic feet per minute. 94% of the solvent was removed from the spray.

In Example 4 below, the effect of solvent volatility upon stripping rate is illustrated.

EXAMPLE 4

200 ml. batches of water (no fibers) containing 5 g. of solvent were stripped with air as in Example 2. The time required to strip 90% of the solvent was measured:

| Solvent | Vapor Pressure at 20° C., mm Hg. | Time Required to strip out 90% Seconds |
| --- | --- | --- |
| Perchloroethylene | 15 | 125 |
| 1,1,1-Trichloroethane | 100 | 32 |
| Methylene Chlorine | 340 | 9 |

In all of the above examples, the solvent removed by air stripping was initially present in large enough quantities to constitute a separate liquid phase. The method of air stripping of pulp is also effective in removing dissolved solvent (provided, of course, that no additional solvent phase is present in the system).

EXAMPLE 5

A 0.5% consistency Kraft pulp suspension was prepared with water previously saturated with perchloroethylene. The suspension was found to contain 176 ppm of dissolved $C_2Cl_4$.

50 ml. of the suspension were placed into a 150 ml coarse glass frit filtering funnel, and air was introduced upward through the funnel outlet at a rate of 6 liters per minute. The $C_2Cl_4$ content of the suspension decreased as follows:

| Time, Sec. | ppm $C_2Cl_4$ |
| --- | --- |
| 0 | 176 |
| 10 | 31.6 |
| 20 | 5.2 |
| 40 | 0.33 |

Effect of Fibers on Stripping Efficiency/Solvent Content Relationship

Murphree Vapor Efficiencies at successively lower solvent contents were obtained, as described in detail subsequently herein, in the absence of and in the presence of fibers, starting with an initial solvent content of 2 wt. % perchloroethylene.

The Murphree Vapor Efficiency is a measure of the stripping efficiency of a given contacting stage and may be expressed as $E_m = (y - y_o)/(y^* - y_o)$, where $y_o$ is the mole fraction of solvent in the gas entering the stage, $y$ is the mole fraction in the gas leaving the stage and $y^*$ is the mole fraction of the solvent which would be present in the off gas if the gas and liquid phases were allowed to come to equilibrium.

In a first or single stage, the incoming gas contains no solvent, $y_o$ is 0 and $E_m = y/y^*$. $y$ is determined by analyzing a sample of the off-gas and $y^*$ can be calculated from the total vapor pressure P, the mole fraction (x) of the solvent in the liquid leaving the stage and H, the Henry's Law constant. That is, $y^*P$ (the partial pressure of the solvent) is equal to Hx, or $y^* = Hx/P$.

For an aqueous solution of a sparingly soluble chlorinated hydrocarbon (for which Henry's law holds reasonably well over the full range of solubility up to saturation), H can be determined from the solvent solubility (c) in water and the vapor pressure ($p_o$) of the pure solvent, at a particular temperature; i.e., $H = p_o/C$. solubilities, vapor pressures and H values, at 20° C., are given below for three chlorinated hydrocarbon solvents.

TABLE I

| | SOLVENT PROPERTIES | | |
| --- | --- | --- | --- |
| Solvent | Solubility in water ppm | Vapor Pressure of pure solvent mm Hg. | Henry's Law constant, H mm Hg/ppm |
| $CH_2Cl_2$ | 13,900 | 335 | 0.0241 |
| $CH_3CCl_3$ | 700 | 100 | 0.1429 |
| $Cl_2C=CCl_2$ | 147 | 14.7 | 0.1000 |

The effect on H of operating at temperatures somewhat above or below 20% is indicated in the following tabulation:

TABLE II

| | TEMPERATURE EFFECTS ON H | | |
| --- | --- | --- | --- |
| | Value of H (mm Hg/ppm) at: | | |
| Solvent | 15° C. | 20° C. | 25° C. |
| $CH_2Cl_2$ | 0.0183 | 0.0241 | 0.0321 |
| $Cl_2C=CCL_2$ | 0.0760 | 0.1000 | 0.1267 |

When undissolved solvent is present in the aqueous phase (the pulp, in the present process), the "partial" pressure of the solvent is simply the vapor pressure of the pure solvent, and $y^* = p_o/P$. In the absence of mass transfer resistance effects, $y^*$ would then, ideally, remain constant until all undissolved solvent had been removed and a plot of Murphree efficiency versus solvent content in the pulp would give a straight line. In fact, however, only an approximately rectilinear plot results, even when no fibers are present in the aqueous phase and the plot is done on log/log paper. The Murphree efficiency in the presence of the fibers is only a fraction of the efficiency which obtains in the absence of fibers, but is still high enough to make gas stripping of pulps a feasible method.

EXAMPLE 6

The above mentioned determinations of Murphree efficiencies at successively lower solvent contents were carried out as follows, appropriate precautions being taken throughout to avoid inaccuracies due to volatile solvent losses, etc.

A. No fibers in aqueous phase

A simulated sieve tray was set up by placing at the bottom of a 2-liter glass graduate (3 inches I.D.) an air manifold consisting of four 9/32 inch I.D. polyethylene nozzles, directed toward the bottom of the cylinder and spaced at the corners of a 1 inch square with their outlets at a distance of ½ inch from the cylinder bottom. 200 ml. of water was placed in the cylinder, thus establishing a "pool" depth of 1⅛ inches. Air at a pressure of 758 mm Hg and a temperature of 20° C. was started through the nozzles in an amount (60 liters/minute) resulting in a superficial vapor velocity of about 0.75 ft./sec.

At time zero, 2.00 ml (3.26 grams) of perchloroethylene were quickly injected below the pool surface. The air flow was allowed to continue for a preselected time. The air was turned off and the system temperature determined. The air input system was lifted above the pool, washed with distilled water and removed. The cylinder contents were then transferred to a wide mouth jar and combined with a 20 ml. cyclohexane wash of the cylinder and a subsequent water rinse. The jar was capped and machine-shaken for 30 minutes and the resulting thick emulsion broken by filtering it through a very fine porosity filter. The cyclohexane layer, containing at least 99% of the perchloroethylene, was then analyzed in a pre-calibrated vapor phase chromatograph. The perchloroethylene content in the aqueous pool at the time the air was turned off could then be calculated from the VPC analysis.

The experiment was repeated a number of times, successively longer stripping periods (up to a maximum of 5 minutes) being used. (No significant water evaporation loss in 5 minutes or less.)

The following data were obtained by the preceding method for stripping of perchloroethylene from water containing no fibers.

TABLE III
AIR STRIPPING OF PERCHLOROETHYLENE DISPERSED IN WATER

| Stripping Time Seconds | Grams $Cl_2C=CCl_2$ in aqueous phase | Temperature at end of run ° C. |
|---|---|---|
| 0 | 3.340 (=$w_o$) | 21 |
| 30 | 2.020 | 20 |
| 60 | 1.336 | 19 |
| 120 | 0.420 | 17 |
| 180 | 0.124 | 16 |
| 240 | 0.034 | 14 |
| 300 | 0.021 | 13 |

$y$, the mole fraction of solvent in the off-gas at any elapsed time $t$, is related to the instantaneous rate $-(dw/dt)_t$ at which the weight ($w$) of solvent in the aqueous phase is then decreasing.

It is apparent that said instantaneous rate will be directly proportional to $w$, i.e., $$-(dw/dt)_t = Kw_t$$

($K$ being a constant).

Upon integration, this equation takes the form $$\ln(w_o/w) = Kt$$

($w_o$ is the value of $w$ at $t = o$).

If $\ln(w_o/w)$ is plotted against $t$ (on semi-log paper), a reasonably linear curve results and a good estimate of $-dw/dt$ at any time $t$ can be made by constructing a tangent at the point on the curve corresponding to $t$, and then determining the slope of the tangent, $$K = \frac{\Delta(\ln w_o/w)}{\Delta_t},$$

and calculating the rate from the relationship $$-(dw/dt)_t = Kw_t.$$

The rate of decrease in $w$ with time must be equal to the rate at which solvent is being removed in the off gas, so $$-(dw/dt)_t = M(yG)$$

where
$M$ = mol. wt. of solvent
$G$ = total gram moles of air, water vapor and solvent exiting per second as the off gas
$y$ = mole fraction solvent in the off gas but $$G = \frac{Q}{\tilde{V}} \cdot \frac{P}{P - p_s - p_w}$$

where
$Q$ is the volumetric rate of (dry) air feed, in liters/second, at the final system temperature and at the total pressure P (ambient in this case) at which the off gas exits,
$\tilde{V}$ is the molar volume of air at P and $t$,
$p_s$ is the partial pressure of the solvent in the off gas, and
$p_w$ is the vapor pressure of water at $t$ (a relative humidity of 100% is assumed for the off gas).

Rewriting the above rate relationship and substituting, $$y = \left(\frac{-dw}{dt}\right)_t \cdot \frac{\tilde{V}(P-p_s-p_w)}{MQP}$$

$p_s$ will not be known, but can be replaced by $yP$, and the resulting equation $$y = \left(\frac{-dw}{dt}\right)_t \cdot \frac{\tilde{V}(P-yP-p_w)}{MQP},$$

can be solved for $y$ by trial and error.

Since undissolved solvent was present in the water, $y^*$ was taken (at each tempeature) as equal to $p_o/P$.

$E_m$ was then calculated as $y/y^*$ for each successively lower solvent content (see Table III above). In Table IV following, the computed values obtained from the raw data of Table III are given. $E_m$ and solvent contents are expressed in percentages in Table IV.

TABLE IV
WATER STRIPPING RESULTS, COMPUTED FROM DATA OF TABLE III

| Time, Sec. | $P_o$ mm Hg | $p_w$ mm Hg | Slope | $\left(\frac{-dw}{dt}\right)_t$ g./sec | $y$ | $y^*$ | $E_m$% | % by Wt. $C_2Cl_4$ |
|---|---|---|---|---|---|---|---|---|
| 0 | 15.3 | 18.7 | 0.01151 | 0.0384 | 0.00538 | 0.0202 | 26.6 | 1.64 |
| 30 | 14.6 | 17.5 | 0.02269 | 0.0329 | 0.00463 | 0.0193 | 23.9 | 1.08 |
| 60 | 14.0 | 16.5 | 0.04298 | 0.0235 | 0.00331 | 0.0185 | 17.9 | 0.663 |

TABLE IV-continued
WATER STRIPPING RESULTS, COMPUTED FROM DATA OF TABLE III

| Time, Sec. | $P_o$ mm Hg | $p_w$ mm Hg | Slope | $\left(\dfrac{-dw}{dt}\right)_t$ g./sec | y | y* | $E_m\%$ | % by Wt. $C_2Cl_4$ |
|---|---|---|---|---|---|---|---|---|
| 120 | 12.5 | 14.5 | 0.1533 | 0.00829 | 0.00116 | 0.0165 | 7.0 | 0.210 |
| 180 | 11.7 | 13.6 | 0.5666 | 0.00267 | 0.00037 | 0.0154 | 2.4 | 0.062 |
| 240 | 10.2 | 12.0 | 2.1375 | 0.000739 | 0.00010 | 0.0136 | 0.77 | 0.017 |

P = 758 mm Hg

B. Fibers present in aqueous phase.

The preceding experiment (A) was repeated, using a 0.5% wt. percent pulp of unbleached Kraft paper as the aqueous phase and extracting with 40 ml (rather than 20 ml) of cyclohexane. The latter change was made to counteract the obviously decreased phase contact efficiency due to the presence of the fibers.

The raw data from the experiment with the pulp and the computed results are given in Tables V and VI, respectively, below.

TABLE V
AIR STRIPPING OF PERCHLOROETHYLENE DISPERSED IN 0.5 WT. % PULP

| Stripping Time, Sec. | Temp. at end of Run, °C. | Wt. $C_2Cl_4$ Found, g. |
|---|---|---|
| 0 | 21 | 3.264 |
| 30 | 20 | 2.231 |
| 60 | 19 | 1.807 |
| 120 | 17 | 1.222 |
| 210 | 15 | 0.810 |
| 300 | 14 | 0.626 |
| 420 | 14 | 0.372 |
| 600 | 13 | 0.124 |

TABLE VI
PULP STRIPPING RESULTS, COMPUTED FROM DATA OF TABLE V

| Time,* sec. | $P_o$ mm Hg | $P_w$ mm Hg | Slope $d(w_o/w)/dt$ | $(-dw/dt)_t$ g./sec. | T | T* | $E_m\%$ | % by wt. $C_2Cl_4$ |
|---|---|---|---|---|---|---|---|---|
| 0 | 15.3 | 18.7 | 0.01762 | 0.0576 | 0.00796 | 0.0202 | 39.4 | 1.60 |
| 50 | 14.0 | 16.5 | 0.01236 | 0.01365 | 0.00189 | 0.0185 | 10.2 | 0.941 |
| 100 | 13.0 | 15.5 | 0.01333 | 0.00762 | 0.00109 | 0.0172 | 6.33 | 0.688 |
| 200 | 11.0 | 12.8 | 0.01400 | 0.00302 | 0.00042 | 0.0145 | 2.91 | 0.418 |
| 300 | 10.2 | 12.0 | 0.01718 | 0.00206 | 0.00029 | 0.0135 | 2.15 | 0.312 |
| 400 | 10.1 | 11.8 | 0.04025 | 0.00207 | 0.00029 | 0.0133 | 2.18 | 0.205 |
| 500 | 10.0 | 11.7 | 0.08381 | 0.00144 | 0.00020 | 0.0132 | 1.53 | 0.118 |
| 600 | 10.0 | 11.6 | 0.1837 | 0.000864 | 0.00012 | 0.0132 | 0.92 | 0.062 |

P = 758 mm Hg
*These are not experimental times, but simply convenient time points chosen from plot of raw data.

Plots of $E_m$ vs $C_2Cl_4$ content were made (on a single sheet of log/log graph paper) from the last two columns of data in each of Tables IV and VI. Comparison of the two plots showed that the presence of 0.5 wt. % of fibers resulted in a curve having the general shape of a flattened S and reduced the Murphree vapor efficiency to a fraction (ranging from about ½ to about 1/4.4) of the efficiency attained in the absence of the fibers. In other words, the volume of gas required to remove a given proportion of dispersed perchloroethylene from a given volume of 0.5% fiber pulp would be from about 2 to about 4.4 times the volume of gas required in the absence of the fibers.

The foregoing ratio range is a measure of the effect of the fiber/water interaction on efficiency of mass transfer and would not be expected to be largely dependent upon the particular solvent to be removed or upon whether or not the amount of solvent present exceeds the solubility limit in water for that solvent. At fiber contents higher than 0.5 wt. percent, up to the apparent limit of operability (~1.5 wt. %), only a minor additional resistance to mass transfer will result. At lower pulp consistencies, down to the economic limit (~0.4 wt.), a somewhat lower resistance obtains. Thus, for the overall range of pulp consistencies contemplated for the practice of the present invention, the ratio of gas volumes in the presence and absence of fibers will range from about 1.5/1 to about 6/1.

Recovery of the solvent content of the off-gas is accomplished by known methods, examples of which are absorption on charcoal or molecular sieves or by chilling, condensing and demisting. Alternatively, the solvent-laden air may be employed in admixture with a suitable fuel supply to heat or power generating means, such as a boiler. That is, the solvent laden air is used to effect combustion of a fuel.

I claim:
1. The method of removing residual amounts of volatile solvents from aqueous pulps of cellulosic fibers by gas stripping, wherein said pulp contains from about 0.4 to about 1.5 weight percent of said fibers comprising intimately contacting said pulp with n volumes of said gas under such conditions of agitation that the pulp consistency remains essentially uniform throughout, thereby removing at least a fraction of said solvent from said pulp,
   the ratio of n to the volumes of said gas required to remove the same fraction of solvent in the same manner, from the same volume of water containing the same initial amount of said solvent, being within the range of from about 1.5/1 to about 6/1.
2. The method of claim 1 in which:
   1. the amount of said solvent in the pulp initially such that if the pulp is dewatered and then steam dried on rubber covered rolls, the rubber will be damaged to an intolerable extent, and
   2. stripping is continued until the content of said solvent in the pulp has been reduced to a level such that said rubber will not be damaged to said extent.
3. The method of claim 1 wherein the solvent carried off in the stripping gas is recovered.
4. The method of claim 1 in which the stripping gas is air.

5. The method of claim 1 in which said contacting is carried out by spraying said pulp into said gas stream.

6. The method of claim 1 in which said contacting is carried out by passing said pulp and said gas in countercurrent flow through a sieve tray column and the content of said fibers in the pulp is 1.0 weight percent or less.

7. The method of claim 1 in which the content of fibers in the pulp is within the range of from about 0.5 to about 0.75 weight percent.

8. The method of claim 4 in which the resulting solvent-laden air is employed to effect combustion of a fuel.

9. The method of claim 1 in which said solvent is perchloroethylene.

10. The method of claim 9 in which said residual amount of said solvent is 170 parts per million or less.

* * * * *